Feb. 13, 1940.   N. J. POUX   2,190,608
SLIDE FASTENER
Filed March 20, 1937

INVENTOR.
Noel J. Poux.
BY Kelley & Chisholm.
ATTORNEYS.

Patented Feb. 13, 1940

2,190,608

UNITED STATES PATENT OFFICE 2,190,608

SLIDE FASTENER

Noel J. Poux, Meadville, Pa., assignor to Talon, Inc., a corporation of Pennsylvania Application March 20, 1937, Serial No. 132,113

11 Claims. (Cl. 24—205)

My invention relates to slide fasteners, and particularly to a means for preventing unintended movement of the slider in a direction tending to open the fastener.

There have been various forms of slider locking and retaining devices proposed in the past, some of which are of simple construction and very effective in use in the majority of the applications of slide fasteners. These locking devices are usually carried by the slider and are adapted to lock anywhere along the fastener stringers. In many instances, however, for example, in the plackets of dresses, openings in corsets or girdles, and flies in men's trousers some of these locking devices have caused trouble due to difficulty of releasing, or if a pin lock is used, there are disadvantages that the pin would tend to catch in the material or in a tearing action, would fall accidentally between the fastener elements and tend to misplace them along the stringers.

In such applications of the fastener it is hardly ever desirable to hold the slider at any position other than its fully closed position. It is, therefore, an object of my invention to provide an improved retaining device which will hold the slider in its fully closed position, when the article is being worn, while allowing intentional movement of the slider along the fastener stringers when it is desired to open the fastener.

In the application of slide fasteners to corsets and girdles, and especially to the plackets of dresses and skirts, and the flies of men's trousers it is usually desirable to provide independent means for attaching the upper ends of the garment together at the top of the fastener. It is, therefore, still another object of my invention to provide a single element having the combined function of holding the upper ends of the fastener together and retaining the slider in closed position.

The upper or top end of the fastener in this specification and in the claims is intended to designate the end of the fastener to which the slider is moved when the fastener is fully closed.

According to the invention the retaining devices and slider are so designed that any tearing forces on the fastener will be resisted by angular surfaces on the retaining members bearing against the outside angular surface of the slider.

In the accompanying drawing, I have shown for the purposes of illustration, one embodiment and two modifications thereof which my invention may assume in practice. In the drawing.

Figure 1:
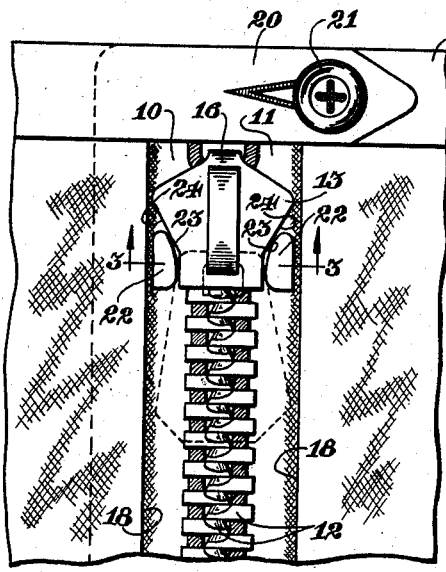
Fig. 1 is a plan view of the upper end of a fastener in the closed position made in accordance with my invention as applied to a skirt placket.
Figure 2:
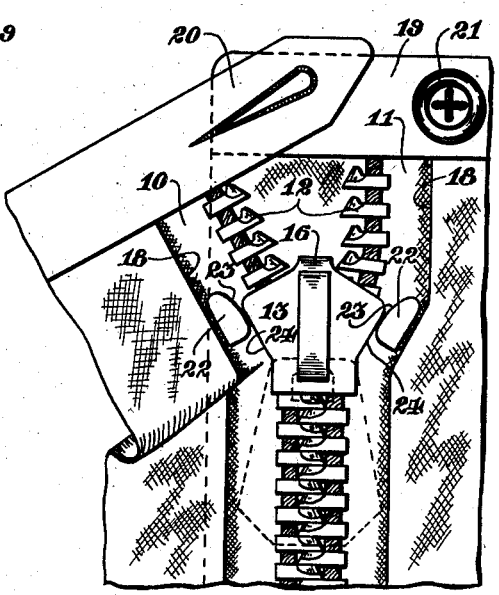
Fig. 2 is a similar view showing the fastener in the opening position.
Figure 3:
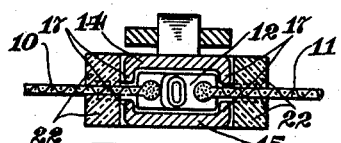
Fig. 3 is a cross-sectional view on line 3—3 of Fig. 1.

I have shown my invention in the placket opening of a skirt, as shown in Figs. 1, 2 and 3. The fastener illustrated has flexible tape stringers 10, 11 and cooperating rows of fastener elements 12 along their adjacent longitudinal edges. The slider 13, is mounted on the fastener elements and moved along them for opening and closing the fastener. It comprises upper and lower wing portions 14, 15, respectively, connected by a narrow middle or neck portion 16, and has side walls or flanges 17 at their outer edges.

The tape stringers are attached to the adjacent edges 18 of the skirt opening and the ends of the stringers terminate in the waistband 19. The waistband is provided with the overlapping portion 20 which is secured in place when the opening is closed by any suitable arrangement, such as hooks and eyes or a button 21.

In order to retain or lock the slider at the upper or top end of the fastener in the closed position, I provide two rubber abutment members 22 molded or vulcanized directly to each side of each of the tape stringers a short distance from the top ends of the stringers and spaced from the row of fastener elements. These retaining or locking members have angular surfaces 23 which cooperate with the angular surface 24 on the wide end of the slider when the same is in its fully closed position and the waistband buttoned to hold the stringers together. When it is desired to open the fastener, the waistband is unbuttoned and the retaining members allow free movement of the slider along the fastener elements in the opening direction.

Figure 6:
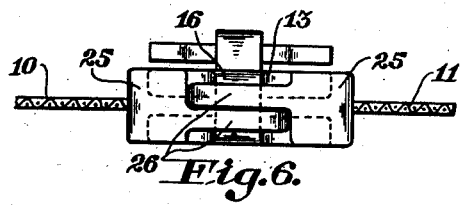
Fig. 5 shows another modified construction and Fig. 6 is an end top view of Fig. 5.
Figure 4:
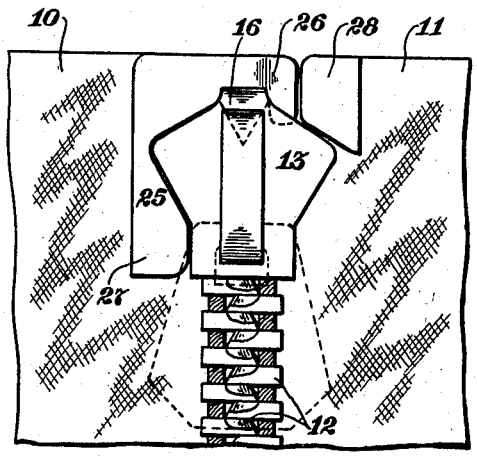
Fig. 4 is the upper end of a fastener showing a modified form of construction.
Figure 5:
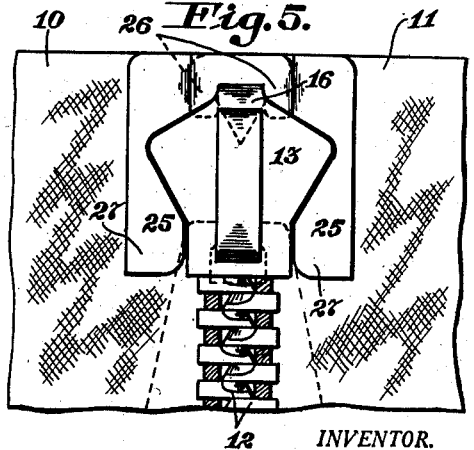

In Figs. 4, 5 and 6, I have shown a modified form of retaining or locking means which also acts to automatically hold the top ends of the fastener together. They consist of a pair of molded rubber members 25, one mounted on the upper end of each of the stringers having hook-like portions 26 which are adapted to cooperate with the neck portion of the slider to hold the ends together, and a lower extending portion 27 which is spaced from the fastener elements and adapted to cooperate with the wide portion of the slider to hold same at the upper or closed end of the fastener. In Fig. 4 I have shown the retaining member mounted on only one of the stringers and a stop member 28 mounted on the other stringer which is a modified form of construction. When the slider is moved to closed position the hook-like portions of the retaining members automatically hook over the neck portion of the slider holding the upper ends of the stringers together, and the lower portion of the members cooperate with the wide end of the slider to prevent movement of the same in the opening direction. When it is desired to open the fastener the hook-like portions are pulled from engagement with the neck and the slider moved along the fastener elements.

It will be observed that the rubber stop or abutment members are spaced away from the fastener elements slightly more than the thickness of the slider flanges. This allows a space to permit the slider to pass between the elements and abutment members quite freely when the fastener is being closed. It also allows the slider to pass freely downwardly whenever the fastener stringers are disengaged and separated above the slider. However, when the fastener stringers are held together by some suitable means such as the button closing illustrated in Figs. 1 and 2 or by the hook construction, shown in Figs. 4 and 5, any tendency for the slider to move downwardly will cause it to abut directly against the angular surfaces of the abutment members. Thus only by a very great force exerted on the slider can it be moved. In effect, therefore, the abutment members serve the same purpose as the conventional locking devices now employed and at the same time, do not interfere with the normal use and operation of the fastener.

While I have shown and described in this application one preferred embodiment and two modifications thereof which my invention may assume in practice, this embodiment and the modifications are merely for the purposes of illustration and description, and various other forms may be devised within the scope of my invention, as set forth in the appended claims.

What I claim as my invention is:

1. In a slide fastener including a pair of stringers having fastener elements along their adjacent edges and a slider movable along said elements for opening and closing the fastener; yieldable means carried by at least one of the stringers adjacent the top of the fastener and having a surface engaging a complementary exterior surface of the slider to lock same against movement in the opening direction when the stringers are held together above the slider and movable outwardly to allow free movement of the slider in said direction when the stringers are not held together above the slider.

2. In a slide fastener including a pair of stringers having spaced fastener elements along their adjacent edges, a slider movable along said elements for opening and closing the fastener, and means for limiting the closing movement of said slider; means to hold the top of the stringers together above the slider, and yieldable retaining means carried by said stringers adjacent the top of the fastener engaged with the exterior surface only of said slider by operation of said last named means to hold said stringers together so that any force tending to move the slider longitudinally along the elements in the opening direction will be resisted by said retaining means.

3. The structure defined in the preceding claim wherein the retaining means comprises an outwardly projecting rubber lug on the surface of each of the stringers and spaced from the rows of fastener elements and adapted to bear against the side of the slider.

4. In a slide fastener including a pair of stringers having spaced fastener elements along their adjacent edges, a slider movable along said elements for opening and closing the fastener, said slider comprising a pair of wing portions connected by a narrow neck portion, the edges of said wings being turned inwardly to provide flanges for guiding the slider and to define an interior diverging channel, and yieldable abutment means carried by said stringers adjacent said upper end engageable with the outside surface only of the flanges of the diverging portion of said slider and cooperable therewith for preventing unintended opening movement of said slider.

5. In a slide fastener, a pair of stringers having spaced fastener elements along their adjacent edges, a slider movable along said elements for opening and closing the fastener, said slider comprising a pair of wing portions rigidly connected by a narrow neck portion to define an interior diverging channel, the edges of said wings being turned inwardly to provide flanges for guiding the slider, and a member at the upper end of at least one of the stringers functioning with said neck portion as means to hold said ends together and having a lug with an angular surface cooperable with the angular outside surface of one of the flanges to lock the slider against unintended movement in the opening direction.

6. In a slide fastener, a pair of stringers having spaced fastener elements along their adjacent edges, a slider movable along said elements for opening and closing the fastener, said slider comprising a pair of wing portions rigidly connected by a narrow neck portion to define an interior channel, the edges of said wings being turned inwardly to provide flanges for guiding the slider, and rubber abutment members on the stringers functioning as means cooperable with the neck portion of the slider to hold said ends together, said abutment members being disposed in the path of movement of said slider when said ends are held together and having surfaces complementary with surfaces of the slider when in closed position, said members being engageable with the outside surface only of the corresponding flanges of the diverging portion of said slider in its closed position to lock the same against unintended movement in the opening direction.

7. The combination defined in the preceding claim wherein the combination of means to hold the stringers together and to lock the slider against movement comprises hook-like members on the end of each stringer, which is adapted to automatically hook over the neck portion of the slider when the same is moved to closed position, to hold said ends separably together, and a lower extending portion spaced from the rows of fastener elements adapted to cooperate with the outside surfaces of the flanges of the diverging portion of the slider to hold same against movement in the opening direction.

8. In a slide fastener, a pair of stringers having spaced fastener elements along their adjacent edges, a slider movable along said elements for opening and closing the fastener, said slider comprising a pair of wing portions connected by a narrow neck portion, the edges of said wings being turned inwardly to provide flanges for guiding the slider and to define an interior diverging channel, means to separably hold the fastener stringers together at the upper ends of the fastener, locking members positioned at said upper ends to lock the slider against unintended movement in the opening direction, said locking members comprising a yieldable abutment secured to each of said stringers in outwardly spaced relation to said fastener elements and being disposed within the path of the slider when the fastener stringers are held together at the upper ends of the fastener, and said locking members each having a portion abutting against one of the outside surfaces of the flanges of the diverging portion of the slider in its closed position whereby a lateral pull on the stringer with any component tending to move the slider in the opening direction will be transmitted to said locking members due to their disposition within the path of the slider.

9. In a fastener consisting of stringers, fastener elements attached to the stringer edges, and a slider movable along the fastener elements, means for holding the top ends of the stringers together when desired, and rubber abutment members secured to each stringer alongside the fastener elements adjacent the top of the stringers but spaced from the fastener elements a distance slightly greater than the thickness of a side wall of the slider and disposed within the path of the slider when the top ends of the stringers are held together, said abutment members functioning blockingly to resist movement of the slider when the stringers are held together above the slider but permitting movement of the slider when the top ends of the stringers are separated.

10. In a slide fastener of the class described, a pair of stringers, fastener elements on the stringer edges, a slider movable on the fastener elements, said slider having angular side surfaces sloping downwardly and inwardly toward the center line of the fastener and yieldable abutment members attached to the stringers alongside the fastener elements and adjacent the top of the fastener and having angular surfaces abutting against said angular surfaces of the slider to resist movement thereof when the stringers are held together above the slider while being spaced from the fastener elements a distance greater than the thickness of a slider side wall to allow the slider to move in either direction when the stringers are separated above the slider.

11. In a slide fastener of the class described, the combination defined in the preceding claim wherein said abutment members consist of rubber elements secured directly to the tape stringer.

NOEL J. POUX.